(12) United States Patent
Ikawa et al.

(10) Patent No.: US 7,487,675 B2
(45) Date of Patent: Feb. 10, 2009

(54) MICRO-HEATER AND SENSOR

(75) Inventors: Koichi Ikawa, Nagoya (JP); Yoshinori Tsujimura, Nagoya (JP); Takio Kojima, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 287 days.

(21) Appl. No.: 11/347,306

(22) Filed: Feb. 6, 2006

(65) Prior Publication Data
US 2006/0174703 A1 Aug. 10, 2006

(30) Foreign Application Priority Data
Feb. 7, 2005 (JP) ............ P. 2005-029993

(51) Int. Cl.
*G01F 1/692* (2006.01)
(52) U.S. Cl. .................................. 73/204.26
(58) Field of Classification Search ............. 436/151; 73/204.26, 204.1, 204.23, 204.251; 374/185
See application file for complete search history.

(56) References Cited

U.S. PATENT DOCUMENTS

| | | | |
|---|---|---|---|
| 4,888,988 A | 12/1989 | Lee et al. | |
| 4,952,904 A | 8/1990 | Johnson et al. | |
| 5,393,351 A | 2/1995 | Kinard et al. | |
| 5,652,443 A | 7/1997 | Kasai | |
| 5,703,287 A | 12/1997 | Treutler et al. | |
| 6,240,777 B1 | 6/2001 | Treutler et al. | |
| 6,450,025 B1 | 9/2002 | Wado et al. | |
| 6,701,782 B2 | 3/2004 | Iwaki et al. | |
| 6,820,481 B1 | 11/2004 | Weber et al. | |
| 2002/0142478 A1* | 10/2002 | Wado et al. | ......... 436/151 |
| 2003/0019290 A1 | 1/2003 | Iwaki et al. | |
| 2004/0118202 A1 | 6/2004 | Iwaki et al. | |

FOREIGN PATENT DOCUMENTS

| | | |
|---|---|---|
| EP | 1 568 990 A1 | 8/2005 |
| JP | 11-194043 | 7/1999 |
| JP | 11-271123 | 10/1999 |
| JP | 2000-2571 | 1/2000 |
| WO | WO 2004/048957 A1 | 6/2004 |

OTHER PUBLICATIONS

I. Simon, N. Bârsan, M. Bauer, U. Weimar. "Micromachined metal oxide gas sensors: opportunities to improve sensor performance." Sensors and Actuators B 73 (2001) pp. 1-26. Accessed online on Jan. 17, 2008. <www.sciencedirect.com>.*

* cited by examiner

*Primary Examiner*—Harshad Patel
*Assistant Examiner*—Punam Patel
(74) *Attorney, Agent, or Firm*—Sughrue Mion, PLLC

(57) ABSTRACT

A micro-heater including a semiconductor substrate having a cavity; an insulating layer provided on an upper side of the semiconductor substrate and closing the cavity; and a heater element embedded in a portion of the insulating layer above the cavity and including a metallic material. The insulating layer includes: a compressive stress film made of silicon oxide; and a tensile stress film made of silicon nitride. The tensile stress film has a thickness not less than that of the compressive stress film.

3 Claims, 5 Drawing Sheets

MICRO-HEATER AND SENSOR

BACKGROUND OF THE INVENTION

1. Field of the Invention

The present invention relates to a micro-heater and a sensor incorporating the micro-heater.

2. Description of the Related Art

The micro-heater disclosed in JP-A-11-271123 (corresponding to U.S. Pat. No. 6,450,025) is a conventionally used micro-heater in which a thin film heating portion is formed across cavity provided in a silicon substrate.

The thin film heating portion is constructed by laminating a tensile stress film made of silicon nitride, a heater layer and a compressive stress film made of silicon oxide. In this manner, the tensile stress and the compressive stress cancel, to thereby release the internal stress of the micro-heater.

Another micro-heater is disclosed in JP-A-11-194043 (corresponding to U.S. Pat. No. 6,240,777). In this micro-heater, both a diaphragm layer and a coating layer are formed to have a small tensile stress.

3. Problems to be Solved by the Invention

In the micro-heater disclosed in JP-A-11-271123 (corresponding to U.S. Pat. No. 6,450,025), the tensile stress component of the internal stress becomes small depending on the film thickness ratio of the compressive stress film to the tensile stress film. As the temperature of the atmosphere, in which the micro-heater operates, rises to a high temperature (e.g., 400° C. or higher), the heater element constituting the heater layer, due to thermal expansion of its forming material, tends to warp the laminated film structure of the tensile stress film, the heater layer and the tensile stress film. As a result, the micro-heater is subjected to thermal stress so as to disadvantageously cause thermal damage. In the micro-heater disclosed in JP-A-11-194043 (corresponding to U.S. Pat. No. 6,240,777), in which the diaphragm layer and the coating layer impart more or less tensile stress, the laminated film structure also becomes warped when the temperature of the atmosphere in which the micro-heater operates exceeds 400° C., to thereby invite a similar disadvantage. Moreover, no consideration is taken in JP-A-11-194043 (corresponding to U.S. Pat. No. 6,240,777) as to the area of the laminated film in a top plan view. As the area of the laminated film becomes large, another problem arises in that the more or less tensile stress of JP-A-11-194043 (corresponding to U.S. Pat. No. 6,240,777) results in a laminated film having insufficient strength (or shock resistance).

In order to cope with the above problems, an object of the present invention is to provide a micro-heater, which prevents, in advance, warpage of a laminated film comprising a tensile stress film and a compressive stress film, even if a heater element embedded in the laminated film is thermally expanded, and which has improved shock-resistance, and a sensor incorporating the micro-heater.

SUMMARY OF THE INVENTION

In order to solve the aforementioned problems, according to a first aspect, the present invention provides a micro-heater comprising: a semiconductor substrate (100) having a cavity (130, 150) provided in its thickness direction; an insulating layer (200) provided on one side (110), namely, an upper side, of the semiconductor substrate and closing the cavity; and a heater element (400) embedded in a portion of the insulating layer above the cavity and made from a metallic material.

The micro-heater is characterized in that the insulating layer includes: a compressive stress film made of silicon oxide and a tensile stress film made of silicon nitride, the tensile stress film having a thickness not less than that of the compressive stress film.

Thus, in the insulating layer, the tensile stress film is made of silicon nitride so as to have a larger film thickness than that of the compressive stress film made of silicon oxide. As a result, the residual internal stress of the insulating layer thus formed is larger than that of a conventional micro-heater.

As a result, when the micro-heater according to the first aspect is operated in the atmosphere at a temperature of 400° C. or higher, the heater element thermally expands to a large extent. Even if this thermal expansion imparts a high thermal stress to the insulating layer, it is effectively released by the aforementioned residual tensile stress.

As a result, the occurrence of warpage is prevented in advance in a portion of the insulating layer above the cavity made of a laminated film structure comprising a tensile stress film and a compressive stress film, so that the thermal stress resistance of the micro-heater can be enhanced.

According to a second aspect, the present invention provides a micro-heater comprising: a semiconductor substrate (100) having a cavity (130, 150) provided in its thickness direction; an insulating layer (200) provided on one side (110), namely, an upper side, of the semiconductor substrate and closing the cavity; and a heater element (400) embedded in a portion of the insulating layer above the cavity, and comprising a metallic material.

The micro-heater is characterized in that the insulating layer includes:
- a first tensile stress film (211) formed on the semiconductor substrate;
- a first compressive stress film (212) laminated on the first tensile stress film;
- a second compressive stress film (221) laminated on the first compressive stress film; and
- a second tensile stress film (222) laminated on the second compressive stress film, wherein
- each of the compressive stress films is made of silicon oxide;
- the first tensile stress film is made of silicon nitride and has a thickness not less than that of the first compressive stress film;
- the second tensile stress film is made of silicon nitride and has a thickness not less than that of the second compressive stress film; and
- the heater element is interposed between the two compressive stress films above the cavity so that it is embedded in the insulating layer.

Thus, in the insulating layer, the respective first and second tensile stress films are made of silicon nitride so as to have a larger film thickness than that of the respective corresponding compressive stress films made of silicon oxide. As a result, the residual internal stress of the insulating layer thus formed is larger than that of a conventional micro-heater.

In the insulating layer, moreover, the respective second tensile and compressive stress films are laminated symmetrically with the respective first compressive and tensile stress films with respect to the second and first compressive stress films sandwiching the heater element.

Therefore, such a symmetrically laminated film structure of the insulating layer easily reduces deformation caused by the difference between the residual tensile stress of the first (lower) films and that of the second (upper) films so that the insulating layer can be made more stable.

As a result, when the micro-heater according to the second aspect of the present invention is operated in the atmosphere at a temperature of 400° C. or higher, the heater element thermally expands to a large extent. Even if this thermal expansion imparts a high thermal stress to the insulating layer, it is more effectively released by the aforementioned residual tensile stress.

As a result, the occurrence of warpage is further prevented in advance in a portion of the insulating layer above the cavity, so that the thermal stress resistance of the micro-heater can be further enhanced.

According to a third aspect, the present invention provides a micro-heater comprising: a semiconductor substrate (100) having a cavity (130, 150) provided in its thickness direction; an insulating layer (200) provided on one side (110), namely, an upper side, of the semiconductor substrate and closing the cavity; and a heater element (400) embedded in a portion of the insulating layer above the cavity and made from a metallic material.

The micro-heater is characterized in that the insulating layer includes:
- a first insulating film provided on the semiconductor substrate; and
- a second insulating film laminated on the first insulating layer, wherein
- the second insulating film and the first insulating film each has a tensile stress of 300 MPa or more; and
- the heater element is interposed between the second insulating film and the first insulating film above the cavity so that it is embedded in the insulating layer.

Thus, the second insulating layer and the first insulating layer are each formed to have a tensile stress of 300 MPa or more. Therefore, the residual internal stress of each of the second insulating layer and the first insulating layer are larger than those of a conventional micro-heater.

As a result, when the micro-heater according to the third aspect is operated in the atmosphere at a temperature of 400° C. or higher, the heater element thermally expands to a large extent. Even if this thermal expansion imparts a high thermal stress to the insulating layer, it is effectively released by the aforementioned residual tensile stress.

As a result, the occurrence of warpage is prevented in advance in a portion of the insulating layer above the cavity made from the laminated film comprising the first insulating layer and the second insulating layer, so that the thermal stress resistance of the micro-heater can be enhanced, According to a fourth aspect of the invention, the micro-heater of the third aspect is characterized in that the first insulating film includes:
- a first tensile stress film (211) formed on one side, namely, an upper side, of the semiconductor substrate; and
- a first compressive stress film (212) laminated on the first tensile stress film, wherein
- the second insulating film includes:
- a second compressive stress film (221) laminated on the first insulating film; and
- a second tensile stress film (222) laminated on the second compressive stress film;
- each of the compressive stress films is made of silicon oxide;
- the first tensile stress film is made of silicon nitride and has a thickness not less than that of the first compressive stress film;
- the second tensile stress film is made of silicon nitride and has a thickness not less than that of the second compressive stress film; and
- the heater element is interposed between the two compressive stress films above the cavity so that it is embedded in the insulating layer.

Thus, in the second insulating layer and the first insulating layer, each of the individual tensile stress films is made of silicon nitride so as to have a film thickness larger than that of the respective corresponding compressive stress films made of silicon oxide. As a result, the residual internal stress imparted by the second insulating layer and the first insulating layer thus formed is larger than that of a conventional micro-heater.

Moreover, the respective second tensile and compressive stress films are laminated symmetrically with the respective first compressive and tensile stress films with respect to the second and first compressive stress films sandwiching the heater element.

Therefore, such a symmetrically laminated film structure of the insulating layer easily reduces deformation caused by the difference between the residual tensile stress of the first (lower) films and that of the second (upper) films so that the insulating layer can be made more stable.

As a result, when the micro-heater according to the fourth aspect is operated in the atmosphere at a temperature of 400° C. or higher, the heater element thermally expands to a large extent. Even if this thermal expansion imparts a high thermal stress to the insulating layer, it is more effectively released by the aforementioned residual tensile stress.

According to a fifth aspect of the invention, moreover, the micro-heater as set forth in any of the first to fourth aspects is characterized in that the insulating layer has a tensile stress of 300 MPa or more.

As a result, when the micro-heater according to the fifth aspect is operated in the atmosphere at a temperature of 400° C. or higher, the heater element thermally expands to a large extent. Even if this thermal expansion imparts a high thermal stress to the insulating layer, it is more effectively released by the aforementioned residual tensile stress. As a result, the occurrence of warpage is prevented in advance in a portion of the insulating layer above the cavity, so that the thermal stress resistance of the micro-heater can be enhanced.

According to a sixth aspect of the invention, moreover, the micro-heater as set forth in any of the first to fifth aspects is characterized in that the area of the insulating layer above the cavity, as viewed in a thickness direction, is 0.25 mm$^2$ or more.

In case the area, as viewed in a thickness direction of the portion of the insulating layer above the cavity is 0.25 mm$^2$ or more, warpage can readily occur at that portion. By applying the invention having a film structure with a higher tensile stress than that of the prior art, therefore, the occurrence of warpage at a portion of the insulating layer above the cavity hollow portion can be prevented so as to improve the shock resistance of the micro-heater.

According to a seventh aspect of the invention, moreover, the micro-heater as set forth in any of the first, second, fourth, fifth and sixth aspects is characterized in that the tensile stress film is formed by a low-pressure CVD method.

As a result, the strength of the tensile stress film can be enhanced to further improve the advantages of the invention as set forth in any of the first, second, fourth, fifth and sixth aspects.

According to an eight aspect, the present invention provides a sensor comprising the micro-heater as set forth in any of the first to seventh aspects.

As a result, it is possible to provide a sensor capable of achieving the advantages of the invention as set forth in any of the first to seventh aspects.

The tensile stress films in any of the first to eighth aspects are made of silicon nitride having a stoichiometric composition or near stoichiometric composition. Here, the stoichiometric composition is exemplified by a composition ratio (Si/N of silicon (Si) to nitrogen (N)=3/4. Moreover, the film thickness ratio of the compressive stress film to the tensile stress film falls within a range of 0.25 to 1 so that the tensile stress film has a film thickness equal to or larger than that of the compressive stress film. Moreover, the film thickness of the insulating layer is desirably 1.0 μm or less. The tensile stress of the insulating layer is further desirably 900 MPa or less, more preferably 800 MPa or less.

Here, the parenthesized numerals of the aforementioned members correspond to the specific members of the embodiments described below.

DESCRIPTION OF REFERENCE NUMERALS

Figure 1:
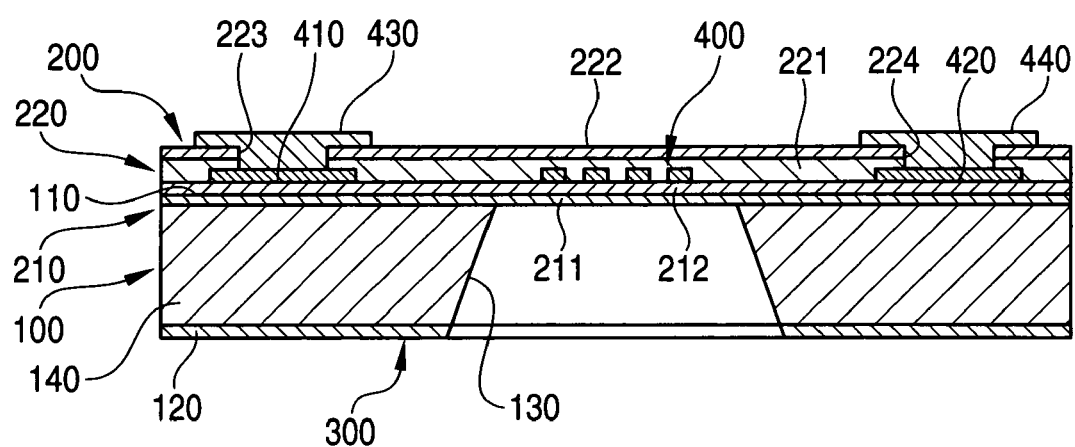
FIG. 1 is a section showing a first embodiment of a micro-heater according to the invention.

Reference numerals used to identify various structural features in the drawings including the following.

100 . . . Semiconductor Substrate, 110 . . . Surface, 130, 150 . . . Cavity, 200 . . . Insulating Layer, 211, 222 . . . Tensile Stress Film, 212, 221 . . . Compressive Stress Film, and 400 . . . Heater element.

DETAILED DESCRIPTION OF THE INVENTION

Preferred embodiments of the invention are described in the following with reference to the accompanying drawings. However, the present invention should not be construed as being limited thereto.

First Embodiment

FIG. 1 shows a first embodiment of a micro-heater according to the invention. This micro-heater is provided with: a semiconductor substrate 100 made from a silicon substrate; an insulating layer 200 formed along the upper surface 100 of the semiconductor substrate 100; and a back insulating film 300 formed on the back 120 of the semiconductor substrate 100.

The semiconductor substrate 100 has a cavity (hollow portion) 130, as shown in FIG. 1. The cavity 130 is formed on the back of the insulating layer 200 so as to extend in a trapezoidal section in its thickness direction in the semiconductor substrate 100.

Figure 2:
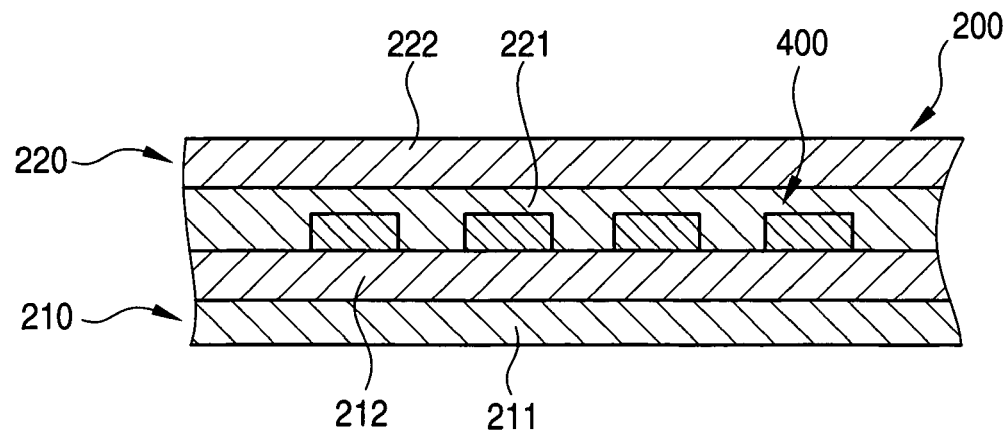
FIG. 2 is an enlarged section of a diaphragm portion of FIG. 1.
Figure 1A:
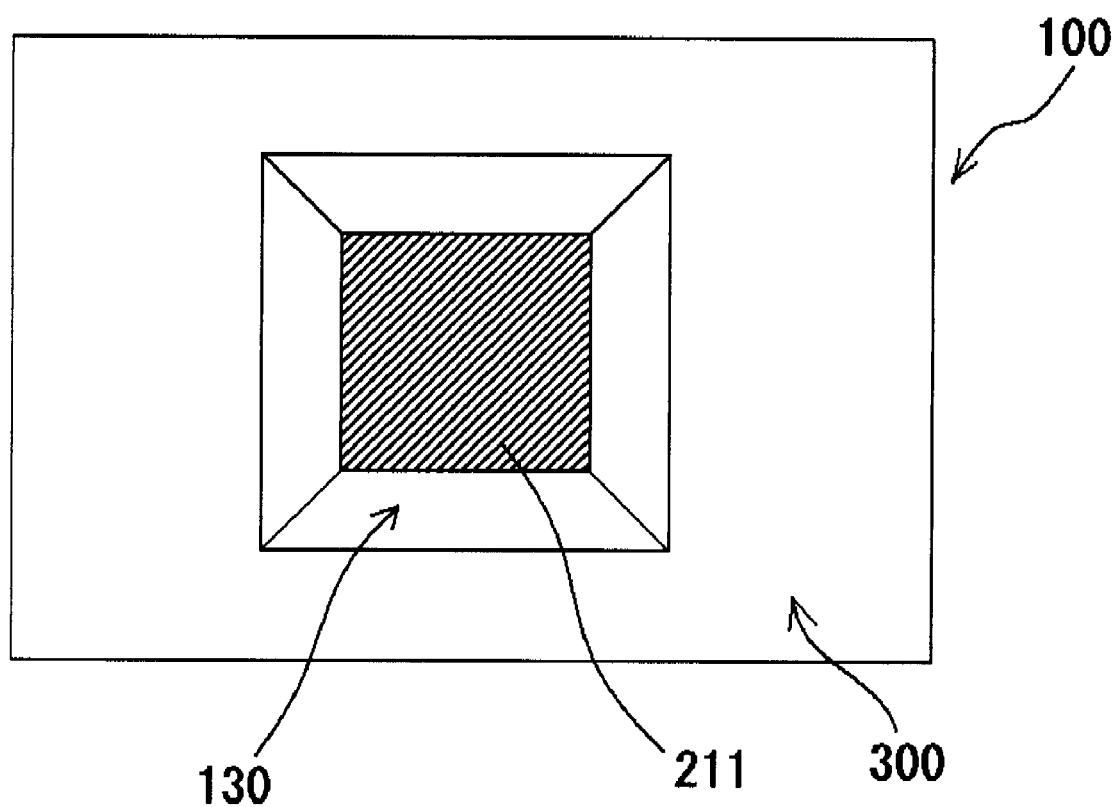
FIG. 1A is a bottom plain view of FIG. 1 showing an area of the insulating layer exposed through cavity 130.

As seen from FIG. 1 and FIG. 2, the insulating layer 200 includes a first thin film 210 and a second thin film 220. The first thin film 210 includes a tensile stress film 211 and a compressive stress film 212. The compressive stress layer 211 is made from silicon nitride into a film shape along the surface 110 of the semiconductor substrate 100. The compressive stress film 212 is made from silicon oxide ($SiO_2$) into a film shape along the surface of the tensile stress film 211.

In the first embodiment, the silicon nitride or a material for forming the tensile stress film 211 is made of $Si_3N_4$ composed of silicon and nitrogen so as to have an atomic composition ratio=silicon (Si)/nitrogen (N)=3/4. Moreover, the tensile stress film 211 has a thickness of 0.2 μm, and the compressive stress film 212 has a thickness of 0.1 μm.

The second thin film 220 includes a compressive stress film 221 and a tensile stress film 222. Like the compressive stress film 212, the compressive stress layer 221 is formed of silicon oxide ($SiO_2$) into a film shape along the surface of the compressive stress film 212. The tensile stress film 222 is made from silicon nitride into a film shape along the surface of the compressive stress film 221.

In this first embodiment, the silicon nitride or the material forming the tensile stress film 222 is composed, like the material forming the tensile stress film 211, of $Si_3N_4$ having a composition ratio=silicon (Si)/nitrogen (N)=3/4. Moreover, the film thickness of the compressive stress film 221 is equal to that of the compressive stress film 212, and the film thickness of the tensile stress film 222 is equal to that of the tensile stress film 211. However, the thickness of the insulating layer 200 is desirably 1.0 μm or less.

Here, the back insulating film 300 is made from silicon nitride ($Si_3N_4$) into a film shape along the back 120 of the semiconductor substrate 100, and is removed below cavity 130 to form an opening of the cavity 130.

As a result, the tensile stress film 211 of the insulating layer 200 is exposed, at its backside above the cavity 130, to the outside through the opening of the cavity 130. Here, the portion of the semiconductor substrate 100 other than the cavity 130 is called the "substrate portion 140".

Moreover, the micro-heater is provided, as shown in FIG. 1, with a heater element 400 and left and right wiring films 410 and 420.

The heater element 400 is clamped between the first thin film 210 and the second thin film 220, i.e., between the compressive stress films 212 and 221 above the cavity 130. The heater element 400 is made of platinum (Pt) into a meandering shape and a thin film shape on the surface of the compressive stress film 212 so as to extend along a direction normal to the sheet of FIG. 1.

In this first embodiment, the portion of the insulating layer 200 above the cavity 130 of the semiconductor substrate 100 is also called the diaphragm portion of the micro-heater, including the heater element 400 embedded therein.

As shown in FIG. 1, the left wiring film 410 is clamped on the left side of the cavity 130 shown in FIG. 1 between the first thin film 210 and the second thin film 220, i.e., between the compressive stress films 212 and 221 above the substrate portion 140 of the semiconductor substrate 100. The left wiring film 410 is made from platinum (Pt) into a thin film on the surface of the compressive stress film 212 so as to extend along a direction normal to the sheet of FIG. 1. Here, the left wiring film 410 is connected with one end of the heater element 400.

As shown in FIG. 1, on the other hand, the right wiring film 420 is clamped on the right side of the cavity 130 shown in FIG. 1 between the compressive stress films 212 and 221 above the substrate portion 140 of the semiconductor substrate 100. The right wiring film 420 is made from platinum (Pt) into a thin film on the surface of the compressive stress film 212 so as to extend along a direction normal to the sheet of FIG. 1. Here, the right wiring film 420 is connected with the other end of the heater element 400.

Moreover, the micro-heater is provided, as shown in FIG. 1, with left and right electrode films 430 and 440. The left electrode film 430 is formed over the left wiring film 410 through a contact hole 223 formed in the second thin film 220. Here, the contact hole 223 is formed at a portion of the second thin film 220 above the left wiring film 410.

The right electrode film 440 is formed over the right wiring film 420 through a contact hole 224 formed in the second thin film 220. Here, the contact hole 224 is formed at a portion of the second thin film 220 above the right wiring film 420.

Next the process for manufacturing the micro-heater thus constructed is described with reference to FIG. 3 to FIG. 6 and FIG. 1. Here, the micro-heater is manufactured by malting use of a micromachining technique.

(1) Step of Forming the Tensile Stress Film 211 and the Back Insulating Film 300

Figure 3:
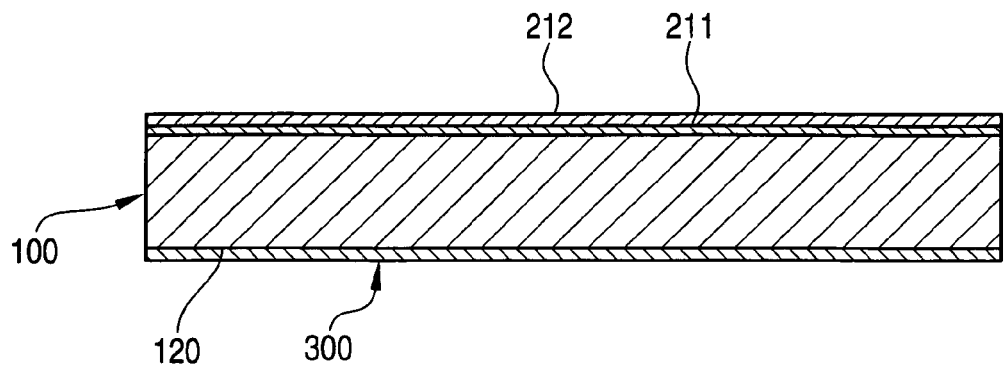
FIG. 3 is a section showing a step for manufacturing the micro-heater of FIG. 1 so as to form a first tensile stress film, a back oxide film and a first compressive stress film on a semiconductor substrate.
Figure 4:
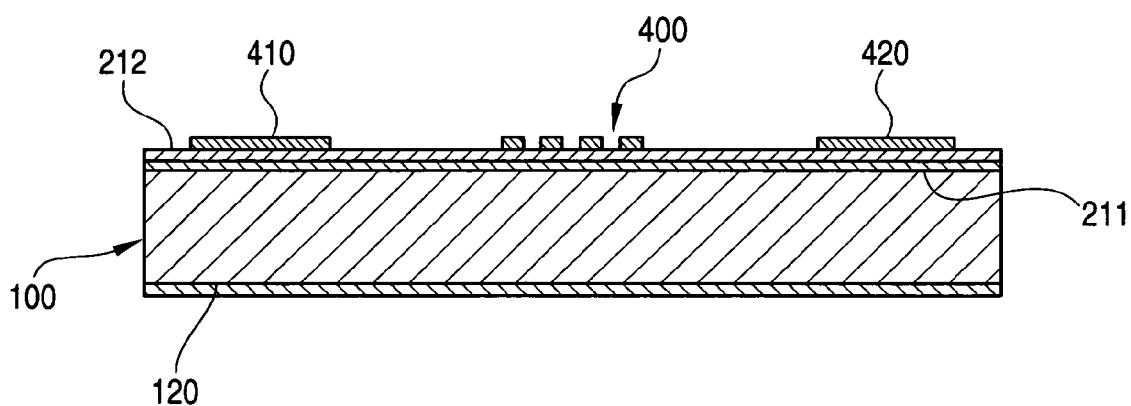
FIG. 4 is a section showing a step of forming a heater element and a wiring film after the step of FIG. 3.

At first, a rinsed silicon substrate is prepared as the semiconductor substrate 100 (as shown in FIG. 3). A tensile stress film 211 made of silicon nitride is formed on the surface of the semiconductor substrate 100 to have a film thickness of 0.2 μm by a low-pressure CVD method (or LP-CVD method), as shown in FIG. 3.

The silicon nitride ($Si_3N_4$) is formed to have the composition ratio=silicon (Si)/nitrogen (N)=3/4, as described above. At the aforementioned time of forming the tensile stress film 211, the insulating film 300 is also formed in a thin film shape on the back 120 of the semiconductor substrate 100 (as shown in FIG. 3).

(2) Step of Forming the Compressive Stress Film 212

After that, the compressive stress film 212 is made from silicon oxide ($SiO_2$) along the surface of the tensile stress film 211 by a plasma CVD method to have a film thickness=0.1 (μm), as shown in FIG. 3.

(3) Step of Forming the Heater Element 400 and the Left and Right Wiring Films 410 and 420

Next, platinum (Pt) is sputtered to form a thin platinum film on the surface of the compressive stress film 212. Then, the platinum film is patterned to form the heater element 400 and the right and left wiring films 410 and 420 integrally on the surface of the compressive stress film 212 (as shown to FIG. 4).

(4) Step of Forming the Compressive Stress Film 221

After this, the compressive stress film 221 made of silicon oxide ($SiO_2$) is formed along the surface of the compressive stress film 212 by a plasma CVD method. The compressive stress film 221 has a film thickness=0.1 (μm) so as to cover the heater element 400 and the left and right wiring films 410 and 420.

(5) Step of Forming the Tensile Stress Film 222

Figure 5:
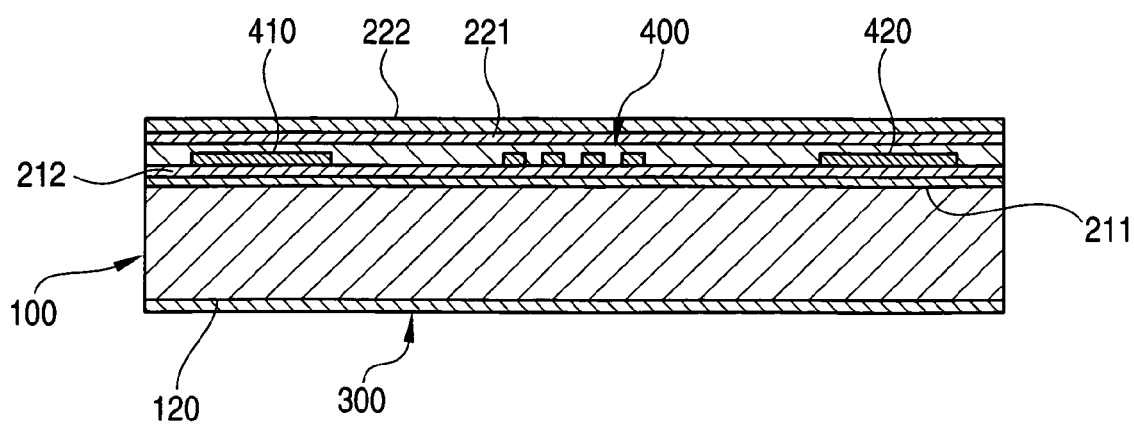
FIG. 5 is a section showing a step of forming a second compressive stress film and a second tensile stress film after the step of FIG. 4.
Figure 6:
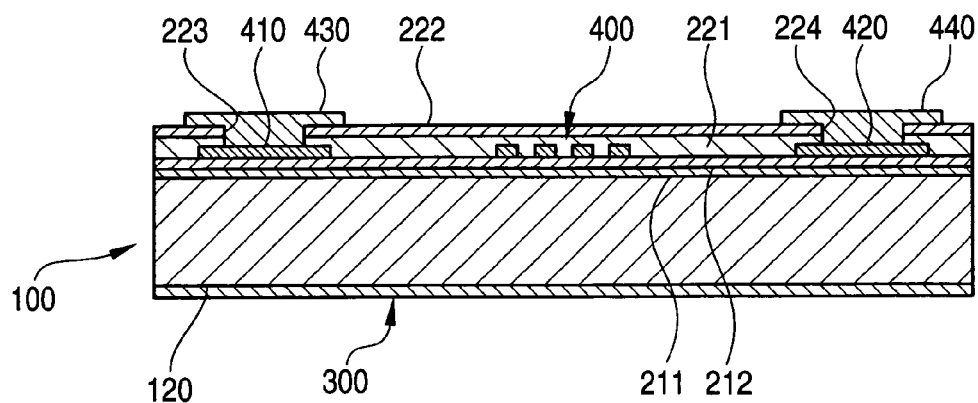
FIG. 6 is a section showing a step of forming an electrode film after the step of FIG. 5.

Next, the tensile stress film 222 made of silicon nitride by a low-pressure CVD method is formed to have a thickness of 0.2 (μm) along the compressive stress film 221, as shown in FIG. 5. As a result, the second thin film 220 composed of the compressive stress film 221 and the tensile stress film 222 is formed symmetrically with the first thin film 210 composed of the tensile stress film 211 and the compressive stress film 212, with respect to the heater element 400, i.e., between the compressive stress films 212 and 221.

The silicon nitride or the material forming the tensile stress film 222, like the material forming the tensile stress film 211, has a composition ratio=silicon (Si)/nitrogen (N)=3/4.

Here, at the aforementioned time of forming the tensile stress film 222, the insulating film 300 is also formed into the thin film shape on the back of the semiconductor substrate 100 (as shown in FIG. 5).

(6) Step of Forming the Electrode Films

At the electrode film forming step, after the tensile stress film 222 is formed, as shown in FIG. 5, the individual portions of the second thin film 220 corresponding to the left and right side wiring films 410 and 420 are etched to form the individual contact holes 223 and 224. As a result, the left and right wiring films 410 and 420 are exposed at their respective surfaces to the outside through corresponding contact holes 223 and 224.

After the contact holes 223 and 224 are formed, as described above, a contact metal such as gold (Au) is sputtered to form a contact metal film on the surface of the tensile stress film 222 to include the individual contact holes 223 and 224. Next, the contact metal film is patterned and etched to form the left and right electrode films 430 and 440 on the individual contact holes 223 and 224, respectively (as shown to FIG. 6).

(7) Step of Forming the Hollow Portion

When the electrode film forming step is thus completed, the back insulating film 300 is patterned and etched, in preparation for forming the cavity 130. Next, the semiconductor substrate 100 is etched with an anisotropic etching liquid (e.g., TMAH). As a result, the cavity 130 is formed in the semiconductor substrate 100 (as shown in FIG. 1). The manufacture of the micro-heater is completed by the steps thus far described.

In the first embodiment thus far described, the first and second tensile stress films 211 and 222 are individually formed, in the insulating layer 200, of silicon nitride having a composition ratio=silicon (Si)/nitrogen (N)=3/4 so as to have a thickness twice as large as that of the corresponding compressive stress films 212 and 221 made of silicon oxide, respectively, As a result, the internal stress of the insulating layer 200 thus formed has a tensile stress component larger than that of a conventional micro-heater.

In the insulating layer 200, moreover, the individual tensile stress film 222 and compressive stress film 221 on the second side (forming the second thin film 220) are laminated symmetrically with the individual compressive stress film 212 and tensile stress film 211 on the first side (forming the first thin film 210) with respect to the compressive stress films 221 and 212 on the second and first sides, respectively, clamping the heater element 400.

As a result, such a symmetrically laminated film structure of the insulating layer 200 easily reduces deformation caused by the difference between the residual tensile stress of the first (lower) films and that of the second (upper) films so that the insulating layer can be made more stable.

Even if, therefore, the micro-heater is placed in an atmosphere at a temperature as high as 400° C., for example, so that the heater element 400 is thermally expanded to a considerable extent so as to impart a high thermal stress on the insulating layer 200, such thermal stress is more effectively relaxed or absorbed by the symmetrically laminated film, as described above.

As a result, warpage can be further prevented in advance at the aforementioned diaphragm portion or the portion of the insulating layer 200 above the cavity 130, to thereby enhance the thermal stress resistance of the micro-heater. As a result, the micro-heater can be stably used even in the aforementioned high-temperature atmosphere.

Especially at the time of an interrupted power supply to the micro-heater, a cooling cycle is repeatedly applied to the diaphragm portion of the insulating layer 200. Even in this case, too, it is possible to prevent warpage of the diaphragm portion. This eliminates problems such as breakage of the diaphragm portion or disconnection of the heater element 400.

As described above, the tensile stress films 211 and 222 are formed by a low-pressure CVD method of silicon nitride having a composition ratio=silicon (Si)/nitrogen (N)=3/4. Therefore, it is possible to enhance the strength of the individual tensile stress films 211 and 222. As a result, the aforementioned advantages become more pronounced.

Here, the stress of the individual tensile stress films and compressive stress films in the micro-heater thus manufactured were indirectly measured by reproducing a tensile stress film and a compressive stress film respectively in the same way as applied to the films in the micro-heater. The tensile stress of the respective compressive stress films was measured to be about −120 (MPa), and the tensile stress of the respective tensile stress films was measured to be about 1,000 (Pa).

As a result of calculation based on the above measurements of the stress in the individual films, it was found that a tensile stress of about 630 (MPa) remained in the entire insulating layer. It is, therefore, understood that the aforementioned warpage can be prevented in advance if the tensile stress is left at that level. The device employed to measure the compressive stress and the tensile stress was the thin film stress measuring device FLX-2320 made by KLA-Tencor Co., ltd. Here, when the stress of the tensile stress film and that of the compressive stress film are represented by σ1 and σ2 respectively, the thickness of the second tensile stress film is represented by d1, the thickness of the second compressive stress film is represented by d2, the thickness of the first compressive stress film is represented by d3, the thickness of the first tensile stress film is represented by d4, the stress acting on the second thin film of the insulating layer is represented by σA, and the stress acting on the first thin film of the insulating layer is represented by σB, σA and σB are defined as follows:

$$\sigma A = (\sigma 1 \times d1 + \sigma 2 \times d2)/(d1+d2)$$

$$\sigma B = (\sigma 2 \times d3 + \sigma 1 \times d4)/(d3+d4)$$

The stress acting on the entire insulating layer is represented by σ and it is defined as follows:

$$\sigma = \{\sigma A(d1+d2) + \sigma B \times (d3+d4)\}/(d1+d2+d3+d4)$$

Second Embodiment

Figure 7:
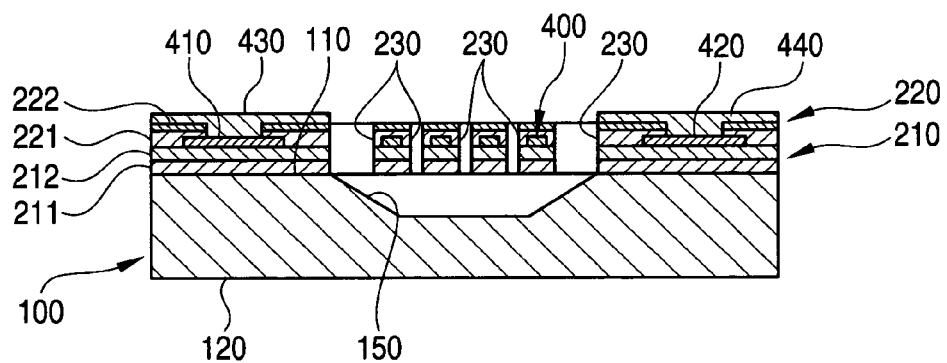
FIG. 7 is a section showing a second embodiment of the micro-heater according to the invention.

FIG. 7 shows a second embodiment of the micro-heater according to the invention. In this second embodiment, the semiconductor substrate 100, as described in connection with the foregoing first embodiment, is constructed to have a cavity 150 in place of the cavity 130. As shown in FIG. 7, the cavity 150 is formed at a portion from the side of the surface 110 of the semiconductor substrate 100 corresponding to the diaphragm portion of the insulating layer 200 described in connection with the first embodiment.

Here, the cavity 150 is formed in the following manner. After the insulating layer 200 is laminated on the surface 110 of the semiconductor substrate 100, as described in connection with the first embodiment, an etching liquid is injected into the semiconductor substrate 100 from the side of the surface of the same, through individual slits 230 (as shown in FIG. 7) formed in the diaphragm of the insulating layer 200 on both sides of the respective meandering lines constituting the heater element 400. As a result, the portion of the semiconductor substrate 100 below the diaphragm portion is etched.

By this etching treatment, as described above, the cavity 150 is formed in a portion of the semiconductor substrate 100 below the diaphragm. The remaining structures are similar to those of the aforementioned first embodiment.

The second embodiment thus constructed has, even when the cavity 150 is formed in the semiconductor substrate 100 from the upper surface side of the same, a laminated film structure of the insulating layer 200 substantially similar to that of the first embodiment. As such, the second embodiment can achieve advantages similar to those of the first embodiment.

Third Embodiment

Figure 8:
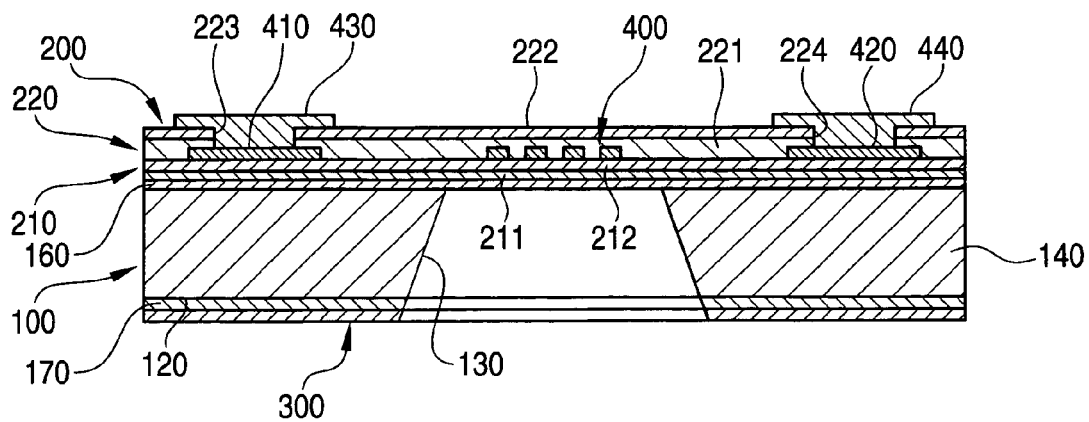
FIG. 8 is a section showing a third embodiment of the micro-heater according to the invention.

FIG. 8 shows a third embodiment of the micro-heater according to the invention. In this third embodiment, the micro-heater described in connection with the foregoing first embodiment is constructed such that, prior to formation of the first tensile stress film 211 and the back insulating film 300, thermally oxidized films 160 and 170 are individually formed along the surface 110 and the back 120 of the semiconductor substrate 100.

Figure 9:
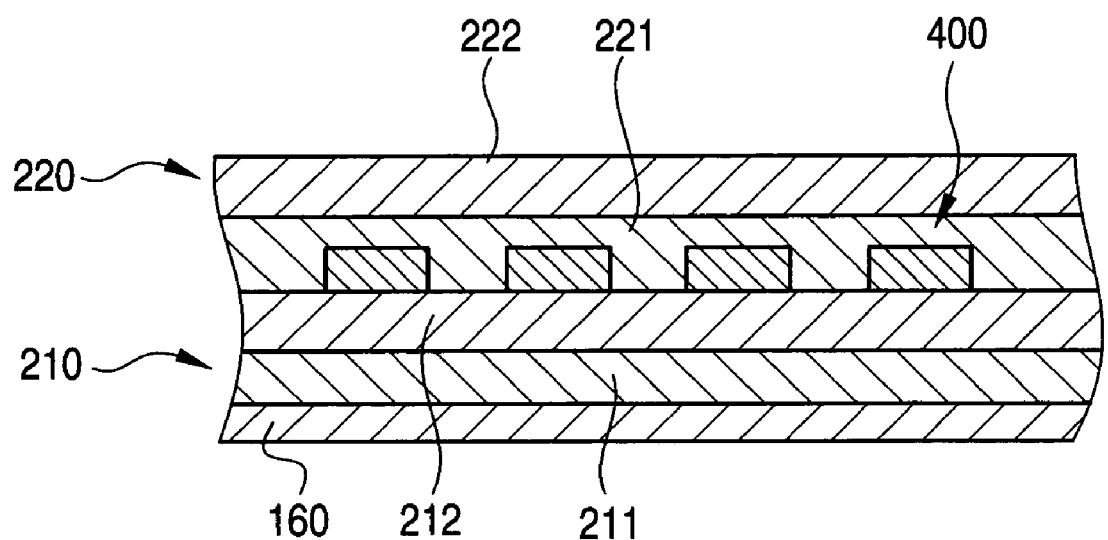
FIG. 9 is an enlarged section showing a diaphragm portion of the micro-heater of FIG. 8.

As a result, the first tensile stress film 211 is formed on the surface 110 of the semiconductor substrate 100 via the thermally oxidized film 160. In other words, the insulating layer 200 described in connection with the first embodiment is laminated, as partially enlarged in FIG. 9, along the surface 110 of the semiconductor substrate 100 via the thermally oxidized film 160. Here, the back insulating film 300 is formed along the back 120 of the semiconductor substrate 100 via the thermally oxidized film 170.

In this third embodiment thus constructed, as described above, the thermally oxidized film 160 is formed along and between the first tensile stress film 211 and the surface 110 of the semiconductor substrate 100, and the thermally oxidized film 170 is formed along and between the back insulating film 300 and the back 120 of the semiconductor substrate 100.

Here, the thermally oxidized film 160 strongly adheres to the film made of silicon nitride so that the adhesion of the tensile stress film 211 to the surface 110 of the semiconductor substrate 100 can also be retained satisfactorily. Like that of the thermally oxidized film 160, adhesion of the insulating film 300 to the back 120 of the semiconductor substrate 100 can be retained satisfactorily by the thermally oxidized film 170. Moreover, the thermally oxidized film 160 is made of silicon oxide ($SiO_2$) and functions as a compressive stress film. In the micro-heater of the third embodiment, moreover, the first compressive stress film 212, the first tensile stress film 211 and the thermally oxidized film 160 constitute the first thin film 210.

In the micro-heater of the third embodiment, the stress of the thermally oxidized film, the individual compressive stress films, and the individual tensile stress films were reproduced respectively in the same way as applied to the films in the micro-heater of the third embodiment, and measured so that the stress of each film in the micro-heater of the third embodiment were indirectly found to be about −330 (MPa), about 1,000 (MPa) and about −120 (MPa), respectively. In this third embodiment, therefore, a tensile stress in the entirety of the insulating layer 200 was calculated based on the above measurements and found to be about 490 (MPa).

Even with the thermally oxidized films 160 and 170 formed as above, therefore, the residual tensile stress can assume a high value to thereby achieve advantages similar to those of the foregoing first embodiment.

EXAMPLES

Here, the following experiments were conducted to confirm the advantages of the invention.

Example 1

Experiments were conducted as to the relationship between the magnitude of the tensile stress of the first and second thin films and thermal stress resistance. At first, a plurality of micro-heaters were manufactured (having sample Nos. 1 to 8 of Table 1), which had a film construction similar to that of the first and third embodiments, but had different film thicknesses of the respective tensile stress films, compressive stress films and thermally oxidized films. Table 1 enumerates the individual thicknesses of the respective tensile stress films, compressive stress films and thermally oxidized films, and the magnitude of the individual tensile stresses of the second thin films, the first thin films and the entire insulating layers of the respective micro-heaters. In Table 1, a micro-heater having a film construction similar to that of the first embodiment is indicated as Type 1 (T1), and a micro-heater having a film construction similar to that of the third embodiment is indicated as Type 2 (T2).

Next, the micro-heaters thus manufactured were evaluated with respect to lifetime expectancy (i.e., the predicted 400° C. lifetimes) simulating operation at 400° C. The experimental results are enumerated in Table 1. In Table 1, the symbol "O" designates a predicted 400° C. lifetime of 10 years or longer, and the symbol "X" designates a predicted 400° C. lifetime shorter than 10 years.

Table 1 shows that the micro-heaters of the Comparative Samples, in which the second thin film or the first thin film had a tensile stress of less than 300 (MPa), had a predicted 400° C. lifetime shorter than 10 years and exhibited poor thermal stress resistance.

The micro-heaters (Sample Nos. 1 to 4) of the invention, on the contrary, had a predicted 400° C. lifetime of 10 years or longer and therefore had excellent thermal stress resistance. The above results confirm that the micro-heaters can be imparted with enhanced thermal stress resistance by setting the tensile stress of each of the first and second thin films to 300 MPa or higher.

Example 2

Subsequently, experiments were conducted to examine the relationship between the diaphragm portion area and tensile strength magnitude of the upper and lower thin films. At first, a plurality of micro-heaters (having sample Nos. 9 to 15 of Table 2) were manufactured, having a film construction similar to that of the third embodiment but differing in diaphragm portion area, and differing in thickness of the respective tensile stress, compressive stress and thermally oxidized films. Table 2 enumerates the diaphragm portion areas, the thickness of the respective tensile stress, compressive stress and thermally oxidized films, and the measured tensile strength of the respective upper thin films, lower thin films and entire insulating layers of the micro-heaters thus prepared. Here, the diaphragm portion area means area measured in the thickness direction of the insulating layer.

Next, the micro-heaters thus manufactured were evaluated with respect to the presence/absence of warpage. Here, the warpage of the diaphragm portion was measured at room temperature using three dimensional surface analysis microscope New View 200 manufactured by ZYGO Corporation. The experimental results are enumerated in Table 2. In Experiment 2, those diaphragm portions exhibiting a low warpage of less than 1 μm were graded "No" in Table 2, and those diaphragm portions exhibiting warpage of 1 μm or more were graded "Yes" in Table 2.

TABLE 1

| Sample Number | Micro-Heater Mode | Film Thickness (nm) | | | | | Tensile Stress (MPa) | | | Evaluation Result of Predicted Lifetime at 400° C. |
|---|---|---|---|---|---|---|---|---|---|---|
| | | Second Tensile Stress Film | Second Compressive Stress Film | First Compressive Stress Film | First Tensile Stress Film | Thermally Oxidized Film | Second Thin Film | First Thin Film | Entire Insulating Layer | |
| 1 | T2 | 200 | 100 | 100 | 200 | 100 | 627 | 388 | 490 | o |
| 2 | T2 | 150 | 150 | 150 | 150 | 50 | 440 | 330 | 381 | o |
| 3 | T1 | 200 | 100 | 100 | 200 | — | 627 | 627 | 627 | o |
| 4 | T1 | 150 | 150 | 150 | 150 | — | 440 | 440 | 440 | o |
| *5 | T2 | 150 | 150 | 200 | 100 | 100 | 440 | 108 | 250 | x |
| *6 | T2 | 100 | 200 | 150 | 150 | 50 | 253 | 330 | 295 | x |
| *7 | T1 | 100 | 200 | 200 | 100 | — | 253 | 253 | 253 | x |
| *8 | T2 | 100 | 200 | 200 | 100 | 100 | 253 | 108 | 170 | x |

Symbol *Comparative Samples

TABLE 2

| Sample Number | Diaphragm Area (mm²) | Film Thickness (nm) | | | | | Tensile Stress (MPa) | | | Occurrence of Warpage |
|---|---|---|---|---|---|---|---|---|---|---|
| | | Second Tensile Stress Film | Second Compressive Stress Film | First Compressive Stress Film | First Tensile Stress Film | Thermally Oxidized Film | Second Thin Film | First Thin Film | Entire Insulating Layer | |
| 9 | 0.3 | 150 | 150 | 150 | 150 | 50 | 440 | 330 | 381 | No |
| 10 | 0.5 | 150 | 150 | 150 | 150 | 50 | 440 | 330 | 381 | No |
| 11 | 1.0 | 150 | 150 | 150 | 150 | 50 | 440 | 330 | 381 | No |
| *12 | 0.2 | 100 | 200 | 200 | 100 | 100 | 253 | 108 | 170 | No |
| *13 | 0.3 | 150 | 150 | 200 | 100 | 100 | 440 | 108 | 250 | Yes |
| *14 | 0.3 | 100 | 200 | 150 | 150 | 50 | 253 | 330 | 295 | Yes |
| *15 | 0.3 | 100 | 200 | 200 | 100 | 100 | 253 | 108 | 170 | Yes |

Symbol *Comparative Samples

Table 2 shows that among micro-heaters of the Comparative Samples, in which the second thin film or the first thin film had a tensile stress of less than 300 MPa, no warpage occurred in the diaphragm of the micro-heater of Sample No. 12 having a diaphragm area of 0.2 mm². However, warpage occurred in the micro-heaters of Comparative Sample Nos. 13 to 15 having a diaphragm area of 0.3 mm².

To the contrary, no warpage occurred in the micro-heaters (Sample Nos. 9 to 11) of the invention although having a diaphragm area of 0.25 mm² or more. By furnishing the micro-heaters with first and second thin films each having a tensile strength of 300 MPa or more, it was confirmed that warpage of the diaphragm portions can be reduced even for micro-heaters having a diaphragm area as large as 0.25 (mm²).

The invention should not be construed as being limited to the aforementioned embodiments, but can be variously modified, for example, as follows.

(1) The film thickness ratios, namely the film thickness of the tensile stress film 211/the film thickness of the compressive stress film 212, and the film thickness of the tensile stress film 222/the compressive stress film 221 may be individually set within a range of 0.25 to 1.

(2) The silicon nitride or material forming the tensile stress film 211 (222) should not be limited to a composition ratio=silicon (Si)/nitrogen (N)=3/4, but may adopt a near stoichiometric composition. This modification can also achieve advantages similar to those of any of the aforementioned embodiments.

Here, the aforementioned stoichiometric composition means $Si_3N_4$, whereas the near stoichiometric composition means a composition ratio of silicon (Si)/nitrogen (N)=0.75 to 0.77.

(3) The insulating layer 200, as described in any of the aforementioned embodiments, may have at a minimum a laminated film structure composed of one tensile stress film and one compressive stress film. The heater element 400 is embedded in the laminated film structure.

(4) A sensor capable of achieving the advantages of the invention can be achieved by incorporating the micro-heater described in any of the above embodiments as the detecting element of a sensor such as a flow sensor or a gas sensor.

This application is based on Japanese Patent application JP 2005-29993, filed Feb. 7, 2005, the entire content of which is hereby incorporated by reference, the same as if set forth at length.

What is claimed is:

1. A micro-heater comprising:
a semiconductor substrate having a cavity;
an insulating layer provided on an upper surface of said semiconductor substrate and closing said cavity; and
a heater element embedded in a portion of said insulating layer above the cavity,
wherein said insulating layer includes:
a first tensile stress film provided on said semiconductor substrate;
a first compressive stress film provided on said first tensile stress film;
a second compressive stress film provided on said first compressive stress film; and
a second tensile stress film provided on said second compressive stress film, wherein
each of said compressive stress films comprises silicon oxide,
said first tensile stress film comprises silicon nitride and has a thickness not less than that of said first compressive stress film,
said second tensile stress film comprises silicon nitride and has a thickness not less than that of said second compressive stress film, and
said heater element is interposed between said first and second compressive stress films above the cavity so that it is embedded in said insulating layer.

2. A micro-heater comprising:
a semiconductor substrate having a cavity;
an insulating layer provided on an upper side of said semiconductor substrate and closing said cavity; and
a heater element embedded in a portion of said insulating layer above the cavity,
wherein said insulating layer includes: a first insulating film provided on said semiconductor substrate; and a second insulating film provided on said first insulating film,
each of said first and second insulating films independently has a tensile stress of 300 MPa or more, and
said heater element is interposed between said first and second insulating films above said cavity so that it is embedded in said insulating layer.

3. The micro-heater as claimed in claim 2, wherein
said first insulating film includes: a first tensile stress film provided on said semiconductor substrate; and a first compressive stress film provided on said first tensile stress film,
said second insulating film includes: a second compressive stress film provided on said first insulating film; and a second tensile stress film provided on said second compressive stress film, wherein each of said compressive stress films comprises silicon oxide, said first tensile stress film comprises silicon nitride and has a thickness not less than that of said first compressive stress film, said second tensile stress film comprises silicon nitride and has a thickness not less than that of said second compressive stress film, and said heater element is interposed between said first and second compressive stress films above the cavity so that it is embedded in said insulating layer.

\* \* \* \* \*